United States Patent

[11] 3,622,533

| [72] | Inventor | Michael Niall Desmond O'Connor<br>Norwalk, Conn. |
|---|---|---|
| [21] | Appl. No. | 878,883 |
| [22] | Filed | Nov. 21, 1969 |
| [45] | Patented | Nov. 23, 1971 |
| [73] | Assignee | American Cyanamid Company<br>Stamford, Conn.<br>Continuation-in-part of application Ser. No. 664,247, Aug. 30, 1967, now abandoned. This application Nov. 21, 1969, Ser. No. 878,883 |

[54] POLYACRYLAMIDE GELS CONTAINING LATENT THERMAL DEGRADATION INHIBITOR
11 Claims, No Drawings

| [52] | U.S. Cl. | 260/29.6 N,<br>260/45.9 R |
|---|---|---|
| [51] | Int. Cl. | C08f 29/00 |
| [50] | Field of Search | 260/29.6<br>HN, 29.6 N, 45.9 R |

[56] References Cited
UNITED STATES PATENTS

| 3,065,193 | 11/1962 | Volk | 260/29.6 |
|---|---|---|---|
| 3,235,523 | 2/1966 | Schurz et al. | 260/29.6 |
| 3,278,506 | 10/1966 | Chamot et al. | 260/89.7 |

FOREIGN PATENTS

| 1,072,693 | 6/1967 | Great Britain | 260/29.6 HN |
|---|---|---|---|
| 1,112,294 | 8/1961 | Germany | 260/29.6 |

*Primary Examiner*—William H. Short
*Assistant Examiner*—E. Nielsen
*Attorney*—Evans Kahn

ABSTRACT: Cyanamide, guanidine, succinimide, and urea inhibit the cross-linking of polyacrylamide without inhibiting the reaction or reactions by which monomeric acrylamide is converted to nontoxic form when aqueous gels containing a final polymer predominately or wholly composed of acrylamide residues and containing a final polymerization catalyst is heated at temperatures above 70° C. until apparently dry.

POLYACRYLAMIDE GELS CONTAINING LATENT THERMAL DEGRADATION INHIBITOR

This is a continuation-in-part of my copending application Ser. No. 664,247 filed on Aug. 30, 1967, and now abandoned.

The present invention relates to aqueous acrylamide gels of acrylamide polymers which contain toxic quantities of monomeric acrylamide, and to the drying of said gels with simultaneous decrease in the amount of the acrylamide present to nontoxic levels and without formation of insoluble cross-linked polymer. The invention includes the manufacture of apparently dry acrylamide polymers which are substantially free from insoluble cross-linked material and from monomeric acrylamide by processes which comprise incorporating one or more nitrogenous monomers into the polymerization mixture or into the polymer-containing gel at any subsequent stage prior to the drying step and then drying the gel at or above a certain temperature. (Acrylamide polymers, as used herein, refer to the homopolymer of acrylamide and to water-soluble copolymers of acrylamide with at least one other vinyl organic compound which forms a linear polymer when copolymerized therewith. The acrylamide is present to the extent of at least 10 mol percent in the polymer.)

Water-soluble acrylamide polymers are prepared industrially by forming an aqueous solution containing 5–15 percent by weight of acrylamide (and if desired a suitable water-soluble vinyl compound copolymerizable therewith), adding a polymerization catalyst (or combination of catalysts), and allowing the solution to stand at appropriate temperature. The product is an aqueous solution containing at least 50 percent water by weight and roughly 5–15 percent by weight of the polymer; because it is normally a viscous or rubbery mass it is hereinafter termed a gel.

The polymerizing reaction generally does not go to completion. The gel product, consequently, contains unreacted acrylamide (typically 0.5–5 percent of the acrylamide taken, and correspondingly small amounts of any other monomers present in the starting mixture), together with an equivalent unconsumed amount of the catalyst.

When dried to a water content of less than about 15 percent by weight the gel becomes a friable solid which can be ground to be free-flowing water-soluble powder. When the drying is performed at low temperature, all of the product is soluble in water. However, when the gel is dried at temperatures above about 70° C., a proportion of the polymer chains cross-link, as a result of which at least a part of the acrylamide polymer is converted to water-insoluble form, and the effectiveness of the polymer as a flocculant decreases. Acrylamide polymers which contain even a trace of insoluble polymeric material are unsatisfactory for most purposes, and any substantial decrease in the efficiency of the flocculant tends to render use of the flocculant uneconomic.

Most acrylamide polymers are nontoxic, but monomeric acrylamide is toxic. Water-soluble acrylamide polymers find use as flocculants for suspended solids in water and as strengthening agents for paper. To ensure safety when these polymers are used for these purposes, the Public Health Service has set 0.05 percent as the maximum permissible amount of acrylamide which may be present in any acrylamide polymer used for the clarification of drinking water. The limit for acrylamide in acrylamide polymers used in the manufacture of paper is 0.2 percent, and a "Poison" label must be affixed to containers of acrylamide polymers which contain monomeric acrylamide in excess of 0.5 percent by weight.

To meet these standards, the polymerization of the acrylamide used for the preparation of these polymers must be driven to at least 99 percent of completion. Acrylamide polymers are heat-sensitive; they cross-link easily at temperatures in excess of about 70° C. resulting in formation of insoluble polymeric material. The rigorous standards imposed by the Public Health Service have handicapped manufacturers of acrylamide polymers because polymers which do not meet the aforesaid standards are not readily saleable, and polymers which do meet the standards are apt to require filtration to remove the insoluble material.

In the past, attempts have been made to detoxify the residual acrylamide by the use of amines and ammonia; cf. Jones U.S. Pat. No. 2,831,481. The procedure is slow and only partially effective, and does not meet present-day standards.

The discovery has now been made that aqueous gels of water-soluble acrylamide polymers which are toxic because of a content of monomeric acrylamide become nontoxic when subject to normal drying, without formation of more than a negligible amount of insoluble polymeric material, and without more than negligible detriment to the flocculating properties of the polyacrylamide, when the gels have a dissolved content of cyanamide, guanidine, succinimide, or urea, or mixtures thereof. Evidently when present in the gel the materials mentioned act as selective latent inhibitors; i.e., they stabilize the acrylamide polymer against the cross-linking reaction that would otherwise occur during the drying step and permit the residual acrylamide to be detoxified by the heating. When present in the starting polymerization mixture, the materials do not interfere to more than a negligible extent with the polymerization of the acrylamide or the monomers copolymerizable therewith.

From another point of view I have discovered that aqueous acrylamide polymer gels containing acrylamide in toxic amounts and a polymerization catalyst therefor can be rendered substantially dry by evaporation of water therefrom at temperatures above 70° C. without insolubilization of the polyacrylamide and with substantially complete polymerization of the residual acrylamide when the gels have a uniformly dissolved small amount of one or more of the four agents mentioned.

The selective action of the inhibitors named above is exceptional. Many other materials have been tried but have been found unsatisfactory. Some are unsatisfactory because they do not cause adequately complete detoxification of the residual acrylamide. Others are unsatisfactory because they do not protect the polyacrylamide from degradation (cross-linking), or are physiologically undesirable, or have offensive odors.

Broadly, the compositions of the present invention are aqueous gels of water-soluble polyacrylamides which contain a small but effective amount of cyanamide, guanidine, succinimide or urea (or mixtures thereof) as latent agents which inhibit the formation of insoluble polymeric material and the degradation of the acrylamide polymer as flocculant which occur when the gel is dried at elevated temperature.

In preferred or particularly useful embodiments the gels contain water, a water-soluble acrylamide polymer, monomeric acrylamide in toxic amount and a polymerization catalyst for the monomeric acrylamide. The gels may also contain such other materials as are customarily present in gels of this type. Such other materials include methanol or some other lower alkanol as stabilizer and as viscosity depressant; sodium sulfate; acetone; a dye (for identification or for other purposes), and a perfume to mask any undesired odor present.

Vinyl residues (i.e., units) other than acrylamide which can be present in the acrylamide polymer may be nonionic (for example, those derived for methyl methacrylate, methylenebisacrylamide, p-chlorostyrene, vinyl acetate and acrylonitrile), or anionic (for example, those derived from acrylic acid, methacrylic acid, allylsulfonic acid, vinylbenzenesulfonic acid, vinyl sulfonic acid), or cationic (for example, those derived from vinylbenzyltrimethyl ammonium chloride, diethylaminoethyl acrylate, diallyldimethyl ammonium chloride, and p-vinylphenyl ammonium chloride).

The amount of inhibitor which is added in any instance depends chiefly on the average cross section of the gel during drying, the length of time at which the gel is maintained at that temperature, and the specific effectiveness of the inhibitor selected. In the case of urea (which appears to be the most efficient inhibitor on a weight basis), the least amount is required when the gel is dried as a thin film (or as thin strands or particles) at about 70° C. with efficient air circulation, so that the gel is reduced to apparently dry state in a comparatively short time. Under these conditions comparatively few cross-linkages form and these are easily inhibited, as gel having this small cross section need remain at cross-linking temperature for not more than a few minutes. More inhibitor is needed if drying is prolonged, i.e., when the gel is in the form of large (e.g. 1 inch) cubes. In such instances complete drying of the cubes takes 1–2 hours at cross-linking temperatures. In general, no more than 2 percent (based on the weight of the acrylamide polymer) of inhibitor need be used, and industrially 0.5 percent of urea has given substantially complete protection.

The polymerization catalyst present in the gel may be any of the catalysts customarily used for the polymerization of acrylamide. Such catalysts include peroxides, (e.g., hydrogen peroxide, sodium peroxide, and t-butyl hydroperoxide) and redox pairs, (e.g. nitrilotrispropionamide-ammonium (or potassium) persulfate, ammonium persulfate-sodium bisulfite, and potassium persulfate-sodium sulfite combinations. The catalyst may be an excess catalyst from the amount initially used for formation of the polymer gel. The catalyst may be added after completion of the polymerization reaction, if for any reason an unduly large amount of the starting catalyst should have been unactivated or volatilized during the polymerization operation.

The compositions of the present invention are gels which may be either viscous liquids or rubbery solids, depending on the concentration and the molecular weight of the polymer therein. Since the concentration of monomeric material to be polymerized in starting polymerization mixtures is generally between about 5 percent and 15 percent by weight, the gels of the present invention generally contain approximately 95 percent to 85 percent of water, but may contain up to 50 percent of water by weight. The precise amount of water, in any instance, however, is not a characterizing feature of the gels of the present invention and may be greater or less than the amount stated.

The thermal degradation inhibitor may be incorporated at any stage in the polymerization process, or the inhibitor may be incorporated into the gel after the polymerization reaction has gone to substantial completion and before the gel has been dried. In the latter instance the gel may be cut into small pieces which may be sprayed with an aqueous solution of the inhibitor; in the course of a few hours the inhibitor diffuses uniformly through the gel and dissolves therein. However, it will generally be found more convenient to dissolve the inhibitor into the initial reaction mixture, before or during the polymerization process, prior to the stage where the reaction mixture becomes a gel. It is an important feature of the present invention that the inhibitor does not significantly affect the action of the polymerization catalyst and does not enter into the polymerization reaction.

The inhibitor is added in sufficient amount to inhibit thermal degradation of the polymer to the desired extent. The term "degradation" in this specification for convenience is used to designate the formation of insoluble polymeric material which occurs as the polymer is maintained above about 70° C. and is also used to designate the decrease in the flocculating efficiency which the heating also causes.

Formation of small amounts of insoluble polymeric material can be readily detected by stirring a small amount of the polymer in neutral water at room temperature and stirring the mixture gently for 3 hours. Any insoluble material present can be detected as gelatinous particles which are termed "fish eyes" in the art, and generally these must be removed (by filtration) before solutions of the polymer can be used.

Deterioration of the flocculating efficiency of the polymer can be determined by forming a substantially self-sustaining suspension of silica, cellulose fines or sewage particles, adding sufficient of the polymer to cause the suspended particles to flocculate and noting the time required for the particles to settle a predetermined distance. Any material increase in the time required for suspensions treated in this manner to settle to this extent (undried polymer being used as the control) indicates that the flocculating efficiency of the polymer has decreased.

The inhibitors may be added in any form which will insure their rapid dissolution in the gel. The urea and succinimide are customarily added as such. The guanidine is most conveniently added as a water-soluble salt thereof. The cyanamide may be added in its free form (as $H_2NCN$) or may be added as a water-soluble salt thereof.

The optimum amount of inhibitor which should be added in any instance depends upon the specific inhibitor (or combination of inhibitors) which are selected, and on the temperature and duration of the drying step. A suitable amount, however, can be readily determined by laboratory trial, as is shown above and in the examples which follow. In the case of polymers at least 50 mol percent composed of acrylamide linkages, our data indicate that best results are obtained when the weight of the inhibitor is in the range of 0.5 percent to 1.5 percent based on the dry weight of the polymer, peak results being generally obtained when the amount of inhibitor is in the middle part of this range, about 0.70 percent. Larger amounts either confer no advantage or are detrimental in that they cause detoxification of the residual acrylamide to proceed less rapidly than would otherwise be the case.

The gels of the present invention, when containing preferred amounts of inhibitor, may be dehydrated to an apparently dry state by evaporation of water therefrom at 70°–100° C. The drying may be performed by any of the present customary methods, preferably in an oven or continuous tunnel hot air drier, the object being to evaporate sufficient water to convert the gel into friable state without local overheating with formation of insoluble polymeric material. Preferably the gel has a high specific surface area during the drying. Thus the gel may be extruded as a ribbon and dried on a steam-heated drum, or it may be extruded in the form of spaghetti which may be dried in continuous tunnel. Such a method is claimed in copending application Ser. No. 41,807 filed on June 1, 1970 by M.L. Zonis, myself G. C. Shah, and Kenneth W. Saunders.

The process of the present invention is capable of simultaneously drying the gel and detoxifying substantially all of the residual unpolymerized acrylamide without significantly impairing the solubility or flocculation efficiency of the polymer.

The invention is further described in the examples which follow. The examples are preferred embodiments of the invention, and the invention should not be regarded as limited thereto.

EXAMPLE 1

The following illustrates the comparative effectiveness of cyanamide, urea, guanidine, and succinimide as agents which inhibit the formation of cross-linkages when an acrylamide polymer gel containing monomeric acrylamide in toxic amount is heated above 70° C. to dry the same and to detoxify the monomeric acrylamide therein. In these runs, the inhibitors are added to the gel before the gel is dried.

The acrylamide polymer used is a tough, rubbery gel containing 1.7 percent (based on the weight of polyacrylamide therein) of residual (monomeric) acrylamide. The gel is prepared by forming (under a blanket of nitrogen) a reaction mixture of 9,000 lb. of deionized and deoxygenated water, 1,000lb. of acrylamide (monomeric, inhibitor-free), 0.04 percent of ammonium persulfate, and 0.16 percent of 3,3',3"-nitrilotrispropionamide (based on the weight of the acrylamide) as redox catalyst, as shown in Kolodny U. S. Pat. No. 3,002,960, and maintaining the mixture at 20° C. under nitrogen for 8 hours. Polymerization proceeds spontaneously. The gel contains about 90 percent of water by weight, 1.7 percent of unreacted acrylamide (based on the dry weight of solids), and sufficient unreacted catalyst to polymerize the residual acrylamide. The gel is completely soluble in water at room temperature.

Into a 1,000-g. portion of the gel in a heavy-bladed (sigma) mixer is blended one of the materials shown in the table below. The material is added in powder state and appears to dissolve rapidly in the gel. The gel is cut into slabs one-fourth inch thick which are placed in a forced draft oven having an air temperature of 85° C. After 2 hours the slabs contain 6 percent water by weight and are hard and brittle sheets which are apparently dry. The dry material is ground in a laboratory grinder equipped with a −40 mesh screen. The −40 mesh product is an apparently dry, free-flowing powder. The powder is analyzed for its content of unpolymerized (monomeric) acrylamide and insoluble matter, and the efficiency of the polymer as a flocculant is determined. The procedure is repeated with the other agents. Results are as follows:

| Number | Percent monomeric Acrylamide in gel [1] | | | Inhibitor | | Flocc. effic., seconds [2] | Insolubles wt. percent [3] |
|---|---|---|---|---|---|---|---|
| | Before drying | After drying | percent decr. | Name | Percent added [1] | | |
| Control | 1.70 | (Not dried) | | | | 54.0 | 0.0 |
| 1 | 1.70 | 0.0 | 100.0 | None | | | 21 |
| 2 | 1.70 | 0.405 | 76.4 | Urea | 0.62 | 63.7 | 0.0 |
| 3 | 1.70 | 1.08 | 36.6 | do [5] | 3.73 | 58.3 | 0.0 |
| 4 | 1.70 | 0.65 | 53.5 | Guanidine [4] | 3.0 | 70.0 | 0.0 |
| 5 | 1.70 | 1.08 | 36.6 | do | 6.0 | 60.7 | 0.0 |
| 6 | 1.70 | 0.28 | 83.5 | Succinimide | 6.35 | 58.2 | 0.0 |
| 7 | 1.70 | 0.28 | 83.5 | Cyanamide [6] | 1.39 | 55.5 | 0.0 |

[1] Based on dry weight of polymer in gel.
[2] Seconds to settle standard laboratory silica suspension (see text above). In absence of polymer, settles in approx. 600 seconds.
[3] After three hours of vigorous agitation with water at room temperature.
[4] Added as 7.79 g. of guanidine nitrate.
[5] Added as 11.48 g. of guanidine carbonate.
[6] Added as free cyanamide ($H_2HCN$).

The results show that the inhibitors substantially completely stabilize polyacrylamide against degradation of its flocculating efficiency and against insolubilization, while permitting a very large amount of polymerization of the residual acrylamide present to occur.

When tested in the same manner:
Acetamide
Ammonium sulfamate
Biuret
Dicyandiamide
Diethyl phosphite
Ethylene glycol
Formaldehyde
Formamide
Hydrazine
Hydroquinone
Hydroxylamine hydrochloride
Mercaptosuccinic acid
Sodium bicarbonate
Sodium isopropyl xanthate
Sodium nitrite are substantially ineffective. In each instance the polyacrylamide undergoes substantial thermal degradation on drying, losing in the process a substantial part of its water-solubility or its flocculating power, or both.

EXAMPLE 2

The following illustrates a procedure similar to the foregoing, but wherein the inhibitor is added to the starting polymerization mixture.

Run A. To a solution of 112 g. of acrylamide in 626 g. of water are added 1.1 g. of urea as cross-linking inhibitor, 48 g. of methanol, and sufficient phosphoric acid to adjust the pH to 3. The solution is then aerated vigorously for 15 minutes at 20° C. and heated to 50° C. To the solution is then added with stirring 200 p.p.m. (based on the weight of the acrylamide) of potassium persulfate and 80 p.p.m. of potassium metabisulfite as redox polymerization catalyst. Stirring is then halted, and the solution is then allowed to polymerize at 50° C. The solution is analyzed for its content of monomeric acrylamide and its flocculation efficiency is determined by standard laboratory test, in the same manner as in example 1.

Run B. The procedure of run A is repeated, except that the amount of urea is decreased to 0.55 g. to determine the comparative effect of this smaller amount.

The resulting polymer gels are completely water-soluble.

The gels are then kneaded in a sigma mixer for a few minutes to ensure uniformity, and the gels are cut into small cubes. The cubes are tray-dried in a forced draft oven having an air temperature of 85° C. for the time shown in the table. The products have water contents of respectively 10.2 percent and 9.2 percent and are hard, granular, and apparently dry.

The products are then ground to 100 percent −40 mesh. The insolubles in the product are determined as well as their flocculation efficiency.

The monomeric acrylamide contents of the two products and the efficiency of the products as flocculants are then redetermined. Results are as follow.

| Run | Hrs. dryed | Percent acrylamide monomer in gel [1] | | | Percent urea added [1] | Flocculation efficiency, sec. [2] | | Percent insol. [2] |
|---|---|---|---|---|---|---|---|---|
| | | Before drying | After drying | Percent decr. | | Before drying | After drying | |
| A | 2.0 | 2.07 | 0.033 | 98.4 | 1.0 | 69.6 | 76.8 | 0.0 |
| B | 2.3 | 2.78 | 0.075 | 97.3 | 0.5 | 71.6 | 74.5 | 0.0 |

[1] Based on weight of polymer.
[2] For test see Example 1.

The results show that the urea does not interfere significantly with the polymerization of the acrylamide and permits substantially all of the residual acrylamide to be converted while the gel is being dried, yet has no detrimental effect on the efficiency of the polyacrylamide as a flocculant.

EXAMPLE 3

The polymerization procedure of example 2 is repeated except that amount of urea added is varied as shown in the table below, addition of the urea is deferred until the polymerization reaction is completed, and the drying time is extended to 2.35 hours at 85° C. The urea is incorporated by the method of example 1. Control (1) is the polyacrylamide gel which has not been treated with inhibitor and which has not been dried. Control (2) is the same gel which has been dried.

| Run | Acrylamide content [1] | | | Percent urea added [2] | Flocc. eff. seconds [4] | Percent insol. [4] |
|---|---|---|---|---|---|---|
| | Before drying | After drying | Percent decr. | | | |
| Control (1) | 1.42 | -- | -- | None | 52.7 | -- |
| Control (2) | 1.42 | None | -- | None | ([5]) | 9.0 |
| 1 | 1.42 | 0.013 | 99.5 | 0.28 | 59.9 | 1.9 |
| 2 | 1.42 | 0.013 | 99.5 | [3] 0.53 | 55.0 | 0.0 |
| 3 | 1.42 | 0.00 | 100.0 | 0.98 | 56.3 | 0.0 |
| 4 | 1.42 | 0.05 | 97.5 | 2.1 | 59.8 | 0.0 |

[1] Based on dry weight of solids.
[2] Based on starting acrylamide.
[3] A sample withdrawn after 2⅔ hours of drying contained 0.00% of acrylamide and 0.5% insolubles.
[4] For method used, see Example 1.
[5] Not tested because content of insolubles is in excess of commercial standard.

Comparison of these results with the results of example 1 indicates that the urea may be added before or after the polymerization step with closely similar results.

EXAMPLE 4

The following illustrates the large scale manufacture of polyacrylamide with the inhibitor added prior to the polymerization step.

To 7,250 lb. of water at 20° C. in a 1,000-gal. closed reactor is added with stirring 1,090 lb. of acrylamide (monomeric, inhibitor-free) and 10.9 lb. of urea. The resulting solution is heated under nitrogen to 50° C. To this is added with stirring 4.9 lb. of a 1 percent aqueous solution of $K_2S_2O_5$ (potassium metabisulfite), 43.6 lb. of a 1 percent aqueous solution of $K_2S_2O_8$ (potassium persulfate), and 80 lb. of methanol; stirring is stopped as soon as the initiators are dispersed. Polymerization is essentially complete in the usual time of 6 hours. The resulting rubbery gel is removed from the reactor by a screw-type pump under a positive pressure of nitrogen, and is extruded through ¼inch orifices upon a moving belt passing through a circulating hot-air drier at 85° C. The rods which emerge from the drier are apparently dry. They are then ground to a powder. The product is free-flowing and apparently dry. It contains less than 0.1 percent by weight of monomeric acrylamide, and dissolves completely when gently stirred for 3 hours in water at 20° C.

In the absence of the added urea the product before drying would contain 1-5 percent residual monomeric acrylamide based on the weight of polyacrylamide therein, and after drying would contain about 20 percent by weight of insoluble polymer.

EXAMPLE 5

The following illustrates the large-scale manufacture of an anionic acrylamide copolymer with addition of the stabilizing agent to the mixture of monomers to be copolymerized.

The general procedure of example 4 is followed. To 7,250 lb. of deoxygenated and deionized water at 20° C. is added with stirring 218 lb. of anhydrous sodium sulfate, 17.4 lb. of acrylic acid (stabilized with 2,000 p.p.m. of eugenol), 854.6 lb. of acrylamide (monomeric, inhibitor-free), and 8.72 lb. of urea. The resulting solution is heated at 50° C. and then 3.9 lb. of a 1 percent solution of $K_2S_2O_5$ and 41.9 lb. of 1 percent solution of $K_2S_2O_8$ are added. Agitation is stopped as soon as the initiators are dispersed. Thereafter the procedure of example 2 is followed.

The dry, ground product corresponds to a 96:4 molar ratio acrylamide:acrylic acid copolymer, and rapidly and completely dissolves in cold water. It contains less than 0.2 percent by weight of unsaturation (monomeric acrylamide+monomeric acrylic acid) calculated as acrylamide.

Had the urea been omitted, the product before drying would have contained 1-5 percent residual (acrylamide+acrylic acid), based on the weight of polymer present, and after drying would have contained about 20 percent of insolubles.

EXAMPLE 6

The following shows the comparative effect of too much inhibitor on conversion of residual monomeric acrylamide and on the amount of insoluble matter in the products after drying, together with the comparative efficiencies of the products as flocculants.

The gel used as starting material is prepared by mixing 920 g. of acrylamide (AM), 80.0 g. of sodium sulfate as polymerization accelerator, 100 g. of methanol as viscosity depressant, and water to make up to 10 kg. at 32° C. The solution is deoxygenated by sparging with nitrogen for 2 hours, adjusted to pH 6.5 by addition of saturated aqueous sodium bicarbonate solution after which 200 p.p.m. (based on the acrylamide), each of $(NH_4)_2S_2O_8$ and $NaBrO_3$, and 20 p.p.m. of $Na_2SO_3$ are added. The mixture is allowed to stand overnight. Polymerization is then complete; the product is a stiff, rubbery gel containing 3.74 percent of monomeric acrylamide based on the polyacrylamide present.

A

Run A. Upon 1 kg. of the gel in a sigma kneader is sprinkled 0.935 g. of powdered urea (1.02 percent on the weight of polyacrylamide present). The mixture is kneaded for 10 minutes.

B

Run B. A second 1 kg. portion of the gel is treated in the same way except that the amount of urea added is doubled (2.04 percent).

Control. A third 1 kg. portion is taken and is reserved as control. To this nothing is added.

The gels are chopped into ¼-inch cubes which are placed for 2.5 hours is a laboratory oven at 85° C., at which time they have a water content of 9.5 percent. The properties of the products are as follow:

| Product | Percent urea added [1] | Percent acrylamide | | | Percent insol. [1] | Floc. effic. secs. [2] |
|---|---|---|---|---|---|---|
| | | Before drying | After drying | Percent decr. | | |
| Control | None | 3.74 | -- | -- | 15 | 78 |
| A | 1.02 | 3.74 | 0.0075 | 99.8 | 0.15 | 55 |
| B | 2.04 | 3.74 | 0.0850 | 97.8 | 0.00 | 57 |

[1] Based on weight of polymer.
[2] See Example 1.

Comparison of Run A with Run B shows that while each amount of urea was about equally as effective as the other, there was a great difference between the two in terms of the amount of monomeric acrylamide detoxified, 1.02 percent of urea causing the detoxification of about 11 times as much acrylamide during the drying as 2.04 percent of urea.

I claim:

1. An aqueous gel consisting essentially of (1) at least 50 percent by weight of water, (2) at least 5 percent by weight of a water-soluble acrylamide polymer at least 10 mol percent composed of acrylamide units, (3) monomeric acrylamide in toxic amount, (4) a polymerization catalyst for said monomeric acrylamide, and (5) a small but effective amount, less than about 2 percent of the weight of said polyacrylamide, of a material selected from the group consisting of cyanamide, guanidine, succinimide, urea, and mixtures thereof, as agents inhibiting the formation of insoluble polymeric material when said gel is heated at a temperature in excess of 70° C. to dry the same and to detoxify said monomeric acrylamide.

2. A gel according to claim 1 wherein the inhibitor is urea.

3. A gel according to claim 1 wherein the inhibitor is guanidine.

4. A gel according to claim 1 having a pH between 3 and 6.

5. A gel according to claim 1 wherein the acrylamide polymer is at least 50 mol percent composed of acrylamide units, and the weight of the inhibiting agent is between 0.5 percent and 1 percent of the weight of said polymer.

6. In the manufacture of an apparently dry water-soluble acrylamide polymer by a process wherein an aqueous gel of a water-soluble acrylamide polymer at least 10 mol percent composed of acrylamide units, said gel containing more than 50 percent water by weight, monomeric acrylamide in toxic amount, and polymerization catalyst for said acrylamide, is heated above about 70° C., thereby drying said gel to a water content of less than about 10 percent by weight and detoxifying said acrylamide: the improvement which consisting essentially in dissolving in said gel a small but effective amount, less than 2 percent based on the weight of said polyacrylamide, of a material selected from the group consisting of cyanamide, guanidine, succinimide, urea, and mixtures thereof as agents inhibiting the formation of insoluble polymeric material while said gel is heated to dry the same and detoxify the monomeric acrylamide therein.

7. A process according to claim 6 wherein the inhibiting agent is milled in dry particulate state into said gel.

8. A process according to claim 6 wherein the amount of inhibiting agent is sufficiently large to prevent formation of insoluble matter during said drying.

9. In the manufacture of an apparently dry, water-soluble acrylamide polymer at least 10 mol percent composed of acrylamide units by a process wherein a water-soluble vinyl polymerizable composition at least 10 mol percent composed of monomeric acrylamide is polymerized in aqueous solution thereby forming an aqueous gel of a water-soluble acrylamide polymer, said gel containing more than 50 percent water by weight, monomeric acrylamide in toxic amount and a polymerization catalyst for said monomeric acrylamide, said gel is heated at a temperature above 70° C. to dry said gel and detoxify the acrylamide therein: the improvement which consists essentially in dissolving in said gel a small but effective amount therefor less than 2 percent based on the weight of said acrylamide polymer, of a material selected from the group consisting of cyanamid, guanidine, succinimide, urea, and mixtures thereof as agent inhibiting the formation of insoluble polymeric material when said gel is heated and dried.

10. A method according to claim 8 wherein the acrylamide is polymerized with a minor amount of acrylic acid.

11. A process for the manufacture of an aqueous gel according to claim 1, which consists essentially in forming an aqueous acrylamide solution, adding thereto a polymerization catalyst and a small but effective amount, less than about X2 percent of the weight of said acrylamide, of a material selected from the group consisting of cyanamide, guanidine, succinamide.

* * * * *

Case No. 23,384

UNITED STATES PATENT OFFICE
CERTIFICATE OF CORRECTION

Patent No. 3,622,533          Dated November 23, 1971

Inventor(s) Michael Niall Desmond O'Connor

It is certified that error appears in the above-identified patent and that said Letters Patent are hereby corrected as shown below:

Column 5, in the table, third column from the left, run 3, change "do$^5$" to -- Do. --; run 5, change "do" to -- Do.$^5$ --; footnote 6 "($H_2HCN$)" should read -- ($H_2NCN$) --.

Signed and sealed this 16th day of May 1972.

(SEAL)
Attest:

EDWARD M. FLETCHER, JR.          ROBERT GOTTSCHALK
Attesting Officer          Commissioner of Patents